United States Patent Office
3,455,714
Patented July 15, 1969

3,455,714
CELLULOSE DERIVATIVES OF IMPROVED DISPERSIBILITY AND PROCESS
Robert G. Bishop, Hopewell, Va., and Armand J. Desmarais and Albert R. Reid, Wilmington, Del., assignors to Hercules Incorporated, Wilmington, Del., a corporation of Delaware
No Drawing. Filed Sept. 1, 1964, Ser. No. 393,713
Int. Cl. C08b 21/00; C09j 3/04
U.S. Cl. 106—205       18 Claims This invention relates to water-soluble gums of improved dispersibility and solution rate in water. More particularly, the time required to disperse, and hence dissolve, particulate water-soluble gum in water is substantially reduced in accordance with this invention.

Water-soluble, natural and synthetic gums have attained wide-spread use in a large number of commercial applications. In general, such gums are dissolved in water prior to or at the time of use. Even though the gums are water soluble, long periods of time are often required to dissolve the gums in water. This is a serious drawback in applications where rapid and ease of solution with a minimum amount of agitation is necessary or desirable. The water solubility of such gums is dependent on both the time required to disperse the particles in water and the time required for the dispersed particles to go into solution. Therefore, in order to improve the water solubility of such gums either the time required to disperse the particles in water or the time required for the particles to go into solution after being dispersed must be reduced.

The problem does not lie in the time required for the dispersed gum particles to go into solution because such individual particles hydrate and swell to form solutions rapidly unless hindered by agglomeration. The difficulty is the undesirably long time required to disperse the particles. The numerous individual particles tend to agglomerate when the gum is mixed with water. Rapid hydration takes place over the surface of such agglomerated aggregates to form gel-coated lumps, the interiors of which are still substantially dry, and these lumps are then extremely difficult to disperse. This effect is aggravated by the fact that some gums have a tendency to float on the surface of the water, allowing partially dissolved particles to agglomerate into large lumps or masses. This phenomena is quite general and has been observed with various of the water-soluble gums in commercial use. In order to break up such lumps or masses and facilitate rapid dispersion and thus solution of the gums, it is necessary to employ costly and powerful mixing equipment capable of developing high shear. Thus, the problem of increasing the dispersion rate of water-soluble gums is largely one of reducing the tendency to form large gel masses and thereby enhancing dispersion of the individual particles of gum through the water to allow rapid hydration and solution of the individual particles without resort to costly and powerful agitation equipment or other time consuming measures.

An object of this invention is to provide water-soluble gums having improved water dispersibility. A further object is to provide a process of modifying water-soluble gums so that the rate they dissolve in water is substantially increased even when using ordinary mixing equipment.

The above and other objects are accomplished by carrying out the process which comprises coating water-soluble gums which tend to agglomerate when mixed with water with certain water-soluble cellulose ethers, water-soluble cellulose esters, and water-soluble mixed cellulose esters which do not aggomerate when added to water, or at least which have a substantially less tendency to agglomerate than the materials being coated therewith. The preferred process comprises the steps of dissolving the coating material in a nonsolvent for the water-soluble gum to be coated, slurrying the water-soluble gum in the resulting solution and removing the coated water-soluble gum by filtration. The coating material can also be sprayed onto the surface being coated. The coated gum is then preferably dried to the extent that it is substantially free flowing. There is thus provided a water-soluble gum which when added to water disperses as individual particles throughout the water so that rapid dispersion and solution of the individual particles occurs without resort to the use of costly and high speed mixing equipment.

This invention is applicable to all water-soluble gums, both natural and synthetic, which have a substantial tendency to agglomerate when added to water in particulate form. Such gums include, by way of example and not limitation, the following cellulose ethers which are often referred to in the art as synthetic gums: alkyl cellulose e.g. methyl cellulose; carboxyalkyl cellulose e.g. carboxymethylcellulose and carboxyethyl celuose; hydroxyethyl cellulose; and alkyl hydroxyalkyl celluose e.g. methyl hydroxypropyl celluluose. Such gums also include, by way of example and not limitation, the following which are often referred to in the art as natural gums: gum tragacanth, sodium alginate, psyllium seed, gum arabic, Irish moss, algin, guar gum, locust bean gum, karaya gum and okra bean gum.

The coating materials which may be used in accordance with this invention include certain water-soluble cellulose ethers, water-soluble cellulose esters and water-soluble mixed cellulose esters which do not have any substantial tendency to form agglomerates when added to water in particulate form. When coating with the preferred process of this invention the coating material must be soluble in both water and the coating medium. Water-soluble cellulose ethers applicable as coating materials include, by way of example and not limitation, (1) hydroxypropyl cellulose of the type described and claimed in copending application Ser. No. 257,064, now Patent No. 3,278,521, filed Feb. 8, 1963, (2) hydroxyethyl hydroxypropyl cellulose of the type described and claimed in copending application Ser. No. 380,609, now Patent No. 3,296,247, filed July 6, 1964, namely the hydroxypropyl cellulose of (1) above containing hydroxyethyl substituent, (3) modified hydroxypropyl cellulose ethers of the type described and claimed in copending application Ser. No. 380,686, now Patent No. 3,357,971, filed July 6, 1964, namely the hydroxypropyl cellulose of (1) above containing ionic substituent including (a) dialkylaminoalkyl hydroxypropyl cellulose e.g. dimethylaminoethyl hydroxypropyl cellulose and diethylaminoethyl hydroxypropyl cellulose, (b) carboxyalkyl hydroxypropyl cellulose e.g. carboxymethyl hydroxypropyl cellulose and carboxyethyl hydroxypropyl cellulose, (c) alkyl carboxyalkyl hydroxypropyl cellulose e.g. α-methyl carboxymethyl hydroxypropyl cellulose, (d) sulfoalkyl hydroxypropyl cellulose e.g. sulfoethyl hydroxypropyl cellulose and sulfopropyl hydroxypropyl cellulose, (e) carboxyl hydroxypropyl cellulose, (f) sulfate hydroxypropyl cellulose; (4) the hydroxypropyl cellulose of (1) above containing additional nonionic substituent including e.g. acyl substituent, for instance acetate and lactate; (5) cellulose esters including e.g. cellulose monoacetate; (6) mixed cellulose esters including e.g. cellulose acetate lactate and cellulose acetate sulfate. All of said copending applications referred to hereinbefore in this paragraph are in the name of Eugene D. Klug as inventor and are assigned to the assignee of the present invention. The cellulose ethers covered by said copending applications are novel compositions. They possess unusual and unexpected properties. The hydroxypropyl M.S. must be at least 2, preferably 3–10. The hydroxyethyl M.S. is 0.05–1.0. The ionic D.S. is 0.001–0.4. These cellulose ethers are soluble in a large number of polar organic solvents and in cold water. They are thermoplastic and have a low equilibrium moisture content.

The purpose of the following paragraph is to explain the use herein and in the prior art of the terms "degree of substitution" ("D.S.") and "M.S."

There are three hydroxyl groups in each anhydroglucose unit in the cellulose molecule. D.S. is the average number of hydroxyl groups substituted in the cellulose per anhydroglucose unit. M.S. is the average number of moles of reactant combined with the cellulose per anhydroglucose unit. For the alkyl, sulfoalkyl, sulfate, dialkylaminoalkyl, carboxyalkyl, or acyl derivatives of cellulose, the D.S. and M.S. are the same. For the hydroxyalkyl derivatives of cellulose, the M.S. is equal to or greater than the D.S. The reason for this is that each time a hydroxyalkyl group is introduced into the cellulose molecule, an additional hydroxyl group is formed which itself is capable of hydroxyalkylation. As a result of this, side chains of considerable length may form on the cellulose molecule. The M.S./D.S. ratio represents the average length of these side chains. Thus, from the foregoing it will be seen that the D.S. of a cellulose derivative can be no higher than 3, whereas the M.S. may be considerably higher than 3, depending on the extent to which side chains are formed.

The following examples are intended to illustrate the invention but not to limit its scope beyond the appended claims. In the examples, percent and parts are by weight unless otherwise indicated.

For the sake of brevity, the following designations will be used sometimes hereinafter: CMC is carboxymethylcellulose, IPA is isopropyl alcohol, MC is methyl cellulose, HEC is hydroxyethyl cellulose, HPC is hydroxypropyl cellulose, HEHPC is hydroxyethyl hydroxypropyl cellulose and CMHPC is carboxymethyl hydroxypropyl cellulose, DMAEHPC is dimethylaminoethyl hydroxypropyl cellulose, DEAEHPC is diethylaminoethyl hydroxypropyl cellulose, CEHPC is carboxyethyl hydroxypropyl cellulose, SEHPC is sulfoethyl hydroxypropyl cellulose, SPHPC is sulfopropyl hydroxypropyl cellulose, α-MCMHPC is α-methyl carboxymethyl hydroxypropyl cellulose.

In Examples 1–31 the following procedure was used to coat the water-soluble gums of this invention. The coating material was dissolved in the coating medium which must be a nonsolvent for the gum to be coated. The gum was added to the coating medium and slurried for a given time interval. The coated gum was recovered by filtration or by siphoning off the coating medium and dried to the extent that it was free flowing. Results and further details are given in Tables 1–3 hereinafter.

In order to evaluate the effectiveness of this invention, the carefully standardized dispersion and solution test hereinafter described was used. A 12-ounce clear glass bottle was placed in a cyclic inverting machine. The machine was set to invert the bottle five complete cycles in 12 seconds. 200 ml. of distilled water at 25° C. was placed in the bottle. One gram of the gum to be tested was added to the water in the bottle. The machine was immediately started and the bottle was inverted 5 times in the set time limit. Each test was run in duplicate and interpreted as follows.

Poor dispersibility—if both runs had lumps or gels with centers of unwetted gum.

Fair dispersibility—if one run lumped and the other did not or if both had fairly large but completely wetted gels.

Good dispersibility—if both runs were free of lumps and large gels.

Excellent dispersibility—if both runs were free of lumps and gels.

TABLE 1 (EXAMPLES 1–20).—WATER DISPERSIBILITY OF COATED WATER-SOLUBLE GUMS COATING CMC—SLURRY COATING PROCESS

| Ex. | Water-Soluble Gum Coated | | Coating Medium | | Coating Material | | Time Slurried, Min. | Temp. of Coating Medium, ° C. | Drying | Water Dispersibility |
|---|---|---|---|---|---|---|---|---|---|---|
| | Type | Parts | Type [1] | Parts | Type | Percent [2] | | | | |
| 1 | CMC | 50 | 70% IPA | 500 | None | | 30 | 25 | Vacuum 2 hr., 60° C | Control—Poor. |
| 2 | CMC | 50 | 70% IPA | 500 | HPC | 0.5 | 30 | 25 | do | Good. |
| 3 | CMC | 50 | 70% IPA | 500 | HPC | 1.0 | 5 | 25 | do | Do. |
| 4 | CMC | 50 | 90% Acetone | 500 | HPC | 2.0 | 20 | 25 | do | Excellent. |
| 5 | CMC | 50 | 80% Acetone | 500 | HPC | 4.0 | 20 | 25 | do | Do. |
| 6 | CMC | 50 | 80% MeOH | 500 | HEHPC | 1.0 | 15 | 25 | do | Do. |
| 7 | CMC | 50 | 70% MeOH | 500 | CMHPC | 1.0 | 20 | 25 | do | Good. |
| 8 | CMC | 10 | 90% IPA | 100 | Cellulose Acetate Lactate | 1.0 | 15 | 25 | do | Do. |
| 9 | CMC | 10 | 80% Acetone | 100 | Cellulose Monoacetate | 10.0 | 20 | 25 | do | Do. |
| 10 | CMC | 30 | 70% MeOH | 300 | Cellulose Acetate Sulfate | 10.0 | 20 | 25 | do | Fair. |
| 11 | CMC | 20 | 80% IPA | 200 | Acetate HPC | 1.0 | 20 | 25 | do | Excellent. |
| 12 | CMC | 20 | 80% IPA | 200 | Lactate HPC | 1.0 | 20 | 25 | do | Do. |
| 13 | CMC | 10 | 80% IPA | 100 | DMAEHPC | 2.0 | 20 | 25 | do | Do. |
| 14 | CMC | 10 | 80% IPA | 100 | DEAEHPC | 2.0 | 20 | 25 | do | Do. |
| 15 | CMC | 10 | 80% IPA | 100 | CEHPC | 2.0 | 20 | 25 | do | Do. |
| 16 | CMC | 10 | 80% IPA | 100 | SEHPC | 2.0 | 20 | 25 | do | Do. |
| 17 | CMC | 10 | 80% IPA | 100 | SPHPC | 2.0 | 20 | 25 | do | Do. |
| 18 | CMC | 10 | 80% IPA | 100 | α-MCMHPC | 2.0 | 20 | 25 | do | Do. |
| 19 | CMC | 10 | 80% IPA | 100 | Carboxyl HPC | 2.0 | 20 | 25 | do | Do. |
| 20 | CMC | 10 | 80% IPA | 100 | Sulfate HPC | 2.0 | 20 | 25 | do | Do. |

[1] Aqueous alcohol or aqueous acetone.
[2] Based on weight of material to be coated.

TABLE 2 (EXAMPLES 21–26)—WATER DISPERSIBILITY OF COATED WATER-SOLUBLE GUMS COATING HEC—SLURRY COATING PROCESS

| Ex. | Water-Soluble Gum Coated | | Coating Medium | | Coating Material | | Time Slurried, Min. | Temp. of Coating Medium, ° C. | Drying | Water Dispersibility |
|---|---|---|---|---|---|---|---|---|---|---|
| | Type | Parts | Type [1] | Parts | Type | Percent [2] | | | | |
| 21 | HEC | 30 | 90% IPA | 300 | None | | 20 | 25 | Vacuum 2 hr., 60° C | Control—Poor. |
| 22 | HEC | 30 | 90% IPA | 300 | HPC | 1.0 | 20 | 25 | do | Excellent. |
| 23 | HEC | 100 | 95% Acetone | 1,000 | HPC | 0.5 | 20 | 25 | do | Do. |
| 24 | HEC | 20 | 95% MeOH | 200 | Cellulose Acetate Lactate | 1.0 | 20 | 25 | do | Do. |
| 25 | HEC | 10 | 80% Acetone | 100 | Cellulose Monoacetate | 1.0 | 20 | 25 | do | Do. |
| 26 | HEC | 20 | 90% IPA | 200 | HPC | 0.03 | 20 | 25 | do | Do. |

[1] Aqueous alcohol or aqueous acetone.
[2] Based on weight of gum to be coated.

TABLE 3 (EXAMPLES 27-31).—WATER DISPERSIBILITY OF COATED WATER-SOLUBLE GUMS COATING VARIOUS GUMS—SLURRY COATING PROCESS

| Example | Water-Soluble Gum Coated | | Coating Medium | | Coating Material | | Time Slurried, Min. | Temp. of Coating Medium, °C. | Drying | Water Dispersibility |
|---|---|---|---|---|---|---|---|---|---|---|
| | Type | Parts | Type [1] | Parts | Type | Percent [2] | | | | |
| 27 | MC | 50 | 80% IPA | 500 | HPC | 1.0 | 20 | 25 | Vacuum 2 hr., 60° C. | Excellent.[3] |
| 28 | Irish Moss | 50 | 95% MeOH | 500 | HPC | 1.0 | 10 | 25 | do | Do. |
| 29 | Guar Gum | 50 | 90% Acetone | 500 | HPC | 1.0 | 30 | 25 | do | Do. |
| 30 | Gum Arabic | 50 | 80% Acetone | 500 | HPC | 1.0 | 20 | 25 | do | Do. |
| 31 | Algin | 50 | 70% MeOH | 500 | HPC | 1.0 | 5 | 25 | do | Do. |

[1] Aqueous alcohol or aqueous acetone.
[2] Based on weight of gum to be coated.
[3] Same gums under same conditions, except without coating, had poor dispersibility in water.

EXAMPLE 32-37

In Examples 32-37, the following procedure was used to coat the water-soluble gums of this invention. The gum was coated with a small pin mixer equipped with a spray head. First the gum was placed in the mixer and wet with about 20% coating medium (based on the weight of the gum) during agitation of the gum. Next coating medium containing coating material was sprayed on the gum while the agitation continued. Finally the gum was dried to the extent that it was free flowing. Results and further details appear in Table 4 hereinafter.

The water-soluble gum thus coated by the spray technique was subjected to the same test as that described above for Tables 1-3 to determine water dispersibility.

TABLE 4 (EXAMPLES 32-37).—WATER DISPERSIBILITY OF COATED H₂O SOLUBLE GUMS COATING HEC—SPRAY COATING PROCESS

| Example | Water-Soluble Gum Coated | | Coating Medium [1] | Coating Material [2] | | Drying Conditions | Water Dispersibility |
|---|---|---|---|---|---|---|---|
| | Type | Parts | | Type | Percent | | |
| 32 | HEC | 50 | 96% Acetone | HPC | 0.05 | 1 hour at 200° F | Good. |
| 33 | HEC | 50 | 98% Acetone | HPC | 0.2 | do | Do. |
| 34 | HEC | 50 | 96% Acetone | HPC | 0.5 | do | Do. |
| 35 | HEC | 50 | 98% Acetone | HPC | 1.0 | do | Do. |
| 36 | HEC | 50 | do | HPC | 2.0 | do | Do. |
| 37 | HEC | 50 | do | HPC | 4.0 | do | Do. |

[1] Aqueous acetone.
[2] Based on weight of gum to be coated. The coating material was sprayed at 1% concentration in coating medium.

With reference to Tables 1-4 above it will be noted that improved dispersibility in water was obtained when the coating material amounted to only 0.03% by weight of the gum. Any amount of coating on the gums will improve their dispersibility in water. It will also be noted that no additional increase is obtained in dispersion by using more than about 2% coating by weight of the gum, although for certain uses it may be desirable to have more than 2% present. Accordingly, the amount of coating is not critical.

Any anhydrous or aqueous organic solvent coating medium may be used provided it is a solvent for the coating material and a nonsolvent for the gum. Examples of such organic solvents include, by way of example and not limitation, acetone, methyl alcohol and isopropyl alcohol.

The temperature of the coating medium is not critical, the only possible limitation being that the coating material must remain substantially all dissolved therein throughout the coating process. Likewise, the length of time the gum is slurried in the coating medium is not critical. As can be seen from Table 1, good results have been obtained in accordance with this invention at slurry times of 5-30 minutes.

The coated gums of this invention may be dried by any drying method and at any temperature, pressure and time applicable to drying particulate material as long as the conditions are such that substantial degradation does not occur.

The benefits derived through the use of this invention are applicable to particulate water-soluble gums regardless of their particle size. The pH of the water into which the coated water-soluble gums of this invention are dissolved has no adverse effect on the improved water dispersibility imparted to the water-soluble gums in accordance with the present invention.

Among the numerous advantages of this invention there may be mentioned the fact that water-soluble gums which tend to agglomerate when added to water can be dispersed and dissolved with little or no agitation and solutions are produced much more rapidly than with prior art gums. In addition, the particle size of the water-soluble gum is of less importance relative to dispersibility.

As many apparent and widely different embodiments of this invention may be made without departing from the spirit and scope thereof, it is to be understood that the invention is not limited to the specific embodiments thereof except as defined in the appended claims.

What we claim and desire to protect by Letters Patent is:

1. As a new composition of matter, a water-soluble gum of improved water dispersibility having a polymeric water-soluble and organo-soluble coating thereon of a material selected from the group consisting of hydroxypropyl cellulose, hydroxyethyl hydroxypropyl cellulose, hydroxypropyl cellulose having ionic substituent, hydroxypropyl cellulose having additional nonionic substituent, cellulose esters, and mixed cellulose esters.

2. As a new composition of matter, a water-soluble gum of improved water dispersibility selected from the group consisting of alkyl cellulose, carboxyalkyl cellulose, alkyl hydroxyalkyl cellulose, hydroxyethyl cellulose, gum tragacanth, sodium alginate, psyllium seed, gum arabic, Irish moss, algin, guar gum, locust bean gum, karaya gum, and okra bean gum, having a polymeric water-soluble and organo-soluble coating thereon of a material selected from the group consisting of hydroxypropyl cellulose, hydroxyethyl hydroxypropyl cellulose, hydroxypropyl cellulose having an ionic substituent, hydroxypropyl cellulose having additional nonionic substituent, cellulose esters, and mixed cellulose esters.

3. The composition of claim 1 wherein said water-soluble gum is carboxyalkyl cellulose.

4. The composition of claim 1 wherein said water-soluble gum is hydroxyethyl cellulose.

5. As a new composition of matter, a water-soluble gum of improved water dispersibility comprising water-soluble carboxymethylcellulose having a coating thereon of polymeric water-soluble and organo-soluble hydroxypropyl cellulose.

6. As a new composition of matter, a water-soluble gum of improved water dispersibility comprising water-soluble hydroxyethyl cellulose having a coating thereon of polymeric water-soluble and organo-soluble hydroxypropyl cellulose.

7. As a new composition of matter, a water-soluble gum of improved water dispersibility comprising water-soluble carboxymethylcellulose having a coating thereon of polymeric water-soluble and organo-soluble cellulose acetate lactate.

8. As a new composition of matter, a water-soluble gum of improved water dispersibility comprising water-soluble carboxymethylcellulose having a coating thereon of polymeric water-soluble and organo-soluble cellulose monoacetate.

9. As a new composition of matter, a water-soluble gum of improved water dispersibility comprising water-soluble hydroxyethyl cellulose having a coating thereon of polymeric water-soluble and organo-soluble cellulose acetate lactate.

10. As a new composition of matter, a water-soluble gum of improved water dispersibility comprising water-soluble hydroxyethyl cellulose having a coating thereon of polymeric water-soluble and organo-soluble cellulose monoacetate.

11. As a new composition of matter, a water-soluble gum of improved water dispersibility having a polymeric water-soluble and organo-soluble coating thereon of a material selected from the group consisting of hydroxypropyl cellulose; hydroxyethyl hydroxypropyl cellulose; cellulose esters; mixed cellulose esters; hydroxypropyl cellulose having an ionic substituent selected from the group consisting of carboxyalkyl, dialkylaminoalkyl, sulfoalkyl, sulfate and carboxyl; hydroxypropyl cellulose having additional nonionic substituent selected from the group consisting of acetate and lactate.

12. Process of improving the water dispersibility of a water-soluble gum comprising coating said gum with a polymeric water-soluble and organo-soluble coating material selected from the group consisting of hydroxypropyl cellulose, hydroxyethyl hydroxypropyl cellulose, hydroxypropyl cellulose having an ionic substituent, hydroxypropyl cellulose having additional nonionic substituent, cellulose esters, and mixed cellulose esters.

13. Process of improving the water dispersibility of a water-soluble gum selected from the group consisting of alkyl cellulose, carboxyalkyl cellulose, alkyl hydroxyalkyl cellulose, hydroxyethyl cellulose, gum tragacanth, sodium alginate, psyllium seed, gum arabic, Irish moss, algin, guar gum, locust bean gum, karaya gum and okra bean gum comprising coating said gum with a polymeric water-soluble and organo-soluble coating material selected from the group consisting of hydroxypropyl cellulose, hydroxyethyl hydroxypropyl cellulose, hydroxypropyl cellulose having an ionic substituent, hydroxypropyl cellulose having additional nonionic substituent, cellulose esters, and mixed cellulose esters.

14. Process of claim 12 wherein said coating is carried out in a coating medium which is a solvent for the coating material and a nonsolvent for the water-soluble gum to be coated.

15. Process of claim 12 wherein the coating is carried out by spraying the water-soluble gum with said coating material.

16. Process of claim 12 wherein said water-soluble gum is carboxyalkyl cellulose.

17. Process of claim 12 wherein said water-soluble gum is hydroxyethyl cellulose.

18. Process of improving the water dispersibility of a water-soluble gum comprising coating said gum with a polymeric water-soluble and organo-soluble coating material selected from the group consisting of hydroxypropyl cellulose; hydroxyethyl hydroxypropyl cellulose; cellulose esters; mixed cellulose esters; hydroxypropyl cellulose having an ionic substituent selected from the group consisting of carboxyalkyl, dialkylaminoalkyl, sulfoalkyl, sulfate and carboxyl; hydroxypropyl cellulose having additional nonionic substituent selected from the group consisting of acetate and lactate.

References Cited

UNITED STATES PATENTS

| | | | |
|---|---|---|---|
| 2,445,226 | 7/1948 | Landers | 252—363.5 |
| 2,992,188 | 7/1961 | Miller | 252—363.5 |
| 3,043,747 | 7/1962 | Long | 167—82 |
| 3,236,792 | 2/1966 | Curtis | 260—17.3 |
| 3,244,695 | 4/1966 | Schweizer | 260—209 |
| 3,251,824 | 5/1966 | Battista | 260—230 |
| 3,256,111 | 6/1966 | Singiser | 117—85 |

DONALD E. CZAJA, Primary Examiner

R. W. MULCAHY, Assistant Examiner

U.S. Cl. X.R.

106—197; 117—100, 166; 252—363.5